(12) United States Patent
Hwang

(10) Patent No.: US 7,341,055 B2
(45) Date of Patent: Mar. 11, 2008

(54) OVERHEATED STEAM OVEN

(75) Inventor: Yun Ic Hwang, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 190 days.

(21) Appl. No.: 10/846,510

(22) Filed: May 17, 2004

(65) Prior Publication Data
US 2005/0121019 A1 Jun. 9, 2005

(30) Foreign Application Priority Data
Dec. 9, 2003 (KR) ...................... 10-2003-0089142

(51) Int. Cl.
*A21B 1/36* (2006.01)
*A47J 27/04* (2006.01)
(52) U.S. Cl. ........................... 126/20; 126/369; 99/467
(58) Field of Classification Search .................. 126/20, 126/369, 369.1, 348, 33, 5; 219/401, 402; 99/330, 337, 467
See application file for complete search history.

(56) References Cited

U.S. PATENT DOCUMENTS

| | | | | |
|---|---|---|---|---|
| 4,392,049 A | * | 7/1983 | Bentley et al. | 126/369 |
| 4,823,767 A | * | 4/1989 | Wust | 126/20 |
| 5,525,782 A | * | 6/1996 | Yoneno et al. | 219/401 |
| 5,552,578 A | * | 9/1996 | Violi | 126/20 |
| 5,715,745 A | * | 2/1998 | Blanton et al. | 126/20 |
| 6,047,632 A | * | 4/2000 | Bouffay et al. | 126/369 |

FOREIGN PATENT DOCUMENTS

JP 2002-71138 A * 8/2002

OTHER PUBLICATIONS

T. Junzo et al., Steam Cooking Device, 5-256455 Patent Abstracts of Japan, Oct. 5, 1993, 1 page.

* cited by examiner

*Primary Examiner*—Josiah C. Cocks
(74) *Attorney, Agent, or Firm*—Staas & Halsey LLP

(57) ABSTRACT

An overheated steam oven which discharges overheated steam to an outside after changing the overheated steam of a high temperature into water. The overheated steam oven includes a cabinet to define a cooking cavity therein, an overheated steam generator to supply overheated steam into the cooking cavity, and an overheated steam discharger to discharge the overheated steam from the cooking cavity to the outside after condensing the overheated steam. The overheated steam discharger includes a cooling water path which is provided on a steam discharging path to exchange heat with the overheated steam discharged from the cooking cavity to the outside.

10 Claims, 5 Drawing Sheets

US 7,341,055 B2

OVERHEATED STEAM OVEN

CROSS-REFERENCE TO RELATED APPLICATIONS

This application claims the benefit of Korean Patent Application No. 2003-89142, filed Dec. 9, 2003 in the Korean Intellectual Property Office, the disclosure of which is incorporated herein by reference.

BACKGROUND OF THE INVENTION

1. Field of the Invention

The present invention relates, in general, to overheated steam ovens and, more particularly, to an overheated steam oven which is designed for home use by simplifying a construction and reducing a size of the overheated steam oven.

2. Description of the Related Art

Generally, to cook foods, the foods may be roasted by heat, such as in a gas oven, the foods may be steamed by vapor, such as in a steaming vessel, or the foods may be boiled with water, such as in a cooking vessel. Also, there are methods to cook foods using microwaves, far infrared rays, and overheated steam, etc.

Cooking using gas ovens may heat foods relatively evenly, but may also result in a taste of the foods deteriorating due to oxidation upon contact with oxygen in air. Cooking using vapor requires a significant amount of water, and the foods may become insipid due to some of the water being absorbed into the foods during cooking. Cooking using cooking vessels may result in the food being burnt by overly heating a part of the foods. Cooking using microwaves or far infrared rays requires that the foods be rotated due to the fact that the radiating directions of the microwaves or the far infrared rays are fixed. Furthermore, control of a temperature of the foods is difficult, thus the foods may easily dry during cooking.

In summary, to appropriately cook foods, cooking apparatuses must evenly heat foods at suitable temperatures. However, the above-mentioned conventional cooking methods often fail to satisfy cooking conditions in that they are frequently unable to appropriately maintain cooking temperatures.

Cooking using overheated steam is a method in which overheated steam is discharged into a cooking cavity. Since cooking using overheated steam evenly heats foods, the foods may not be partially burnt, and a cooking temperature is easily controlled by controlling a volume of the discharged overheated steam. Also, since oxidation of foods does not occur, cooking using the overheated steam has an advantage in that cooked foods have a better taste.

In conventional cooking apparatuses using the overheated steam, the overheated steam supplied into the cooking cavity accomplishes a cooking operation. The overheated steam is thereafter discharged from the cooking cavity to an outside of the cavity. However, because the overheated steam discharged to the outside has a high temperature, if a user handles the cooking apparatus without caution and care, the overheated steam may burn the user.

SUMMARY OF THE INVENTION

Accordingly, an aspect of the present invention, provides an overheated steam oven which discharges overheated steam to an outside after changing the overheated steam of a high temperature into water so as to allow a user to use the overheated steam oven safely.

Additional and/or other aspects and advantages of the invention will be set forth in part in the description which follows and, in part, will be obvious from the description, or may be learned by practice of the invention.

The above and/or other aspects are achieved by providing an overheated steam oven, including a cabinet to define a cooking cavity therein, an overheated steam generator to supply overheated steam into the cooking cavity, and an overheated steam discharger to discharge the overheated steam from the cooking cavity to an outside after condensing the overheated steam. The overheated steam discharger includes a cooling water path which is provided on a steam discharging path to exchange heat with the overheated steam discharged from the cooking cavity to the outside.

In an embodiment of the invention, the overheated steam discharger includes first and second steam discharging pipes extending from the cooking cavity to the outside to define the steam discharging path, and a steam condensing vessel provided between the first and second steam discharging pipes to define the cooling water path therein. The steam condensing vessel includes a steam condensing chamber defined in the steam condensing vessel to pass the overheated steam discharged from the cooking cavity, and a steam inlet and a steam outlet provided on opposite sidewalls of the steam condensing vessel to be coupled to the first and second steam discharging pipes, respectively.

In another embodiment of the invention, the steam condensing vessel further includes a cooling water inlet chamber provided in the steam condensing vessel to be partitioned from the steam condensing chamber, with a cooling water inlet provided on a predetermined portion of the cooling water inlet chamber, a cooling water outlet chamber provided in the condensing vessel to be partitioned from both the steam condensing chamber and the cooling water inlet chamber, with a cooling water outlet provided on a predetermined portion of the cooling water outlet chamber, and a cooling water pipe. The cooling water pipe is installed in the steam condensing chamber to define the cooling water path along which cooling water flows from the cooling water inlet chamber to the cooling water outlet chamber via the steam condensing chamber.

In another embodiment of the invention, the steam condensing vessel may have a rectangular box shape, and both the cooling water inlet chamber and the cooling water outlet chamber may be provided at a first end in the steam condensing vessel to be close to each other. The steam condensing vessel further includes a cooling water passing chamber which is provided at a second end in the steam condensing vessel. The cooling water pipe includes a first cooling water pipe coupled at an inlet thereof to the cooling water inlet chamber and coupled at an outlet thereof to the cooling water passing chamber, and a second cooling water pipe coupled at an inlet thereof to the cooling water passing chamber and coupled at an outlet thereof to the cooling water outlet chamber.

In another embodiment of the invention, the first cooling water pipe comprises a plurality of cooling water pipes which are arranged in the steam condensing chamber to be spaced apart from each other, and the second cooling water pipe may comprise a plurality of cooling water pipes which are arranged in the steam condensing chamber to be spaced apart from each other.

In another embodiment of the invention, the overheated steam oven further includes a partition longitudinally provided along the cooling water pipe in the steam condensing chamber to partition a space defined in the steam condensing chamber, to increase a length of the steam discharging path in the steam condensing chamber.

In another embodiment of the invention, the steam inlet and the steam outlet of the steam condensing chamber are respectively provided on the opposite sidewalls of the steam condensing vessel, which are close to the cooling water outlet chamber and the cooling water inlet chamber. The partition extends into the space defined in the steam condensing chamber to be perpendicular to both the steam inlet and the steam outlet, and is mounted at a first end thereof, which is close to the steam inlet and the steam outlet on an inner surface of the steam condensing chamber, and is spaced apart from the inner surface of the steam condensing chamber at a second end of the partition. Thus, the partition closes the steam discharging path at the first end thereof and opens the steam discharging path at the second end thereof, to define the steam discharging path in the steam discharging chamber.

In another embodiment of the invention, the overheated steam oven further includes a cooling water feed pipe coupled to the cooling water inlet, and a cooling water discharging pipe coupled to the cooling water outlet.

In another embodiment of the invention, the steam outlet is provided on a lower portion of the steam condensing vessel so that water, condensed from the overheated steam passing through the steam condensing chamber, is discharged to the outside.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
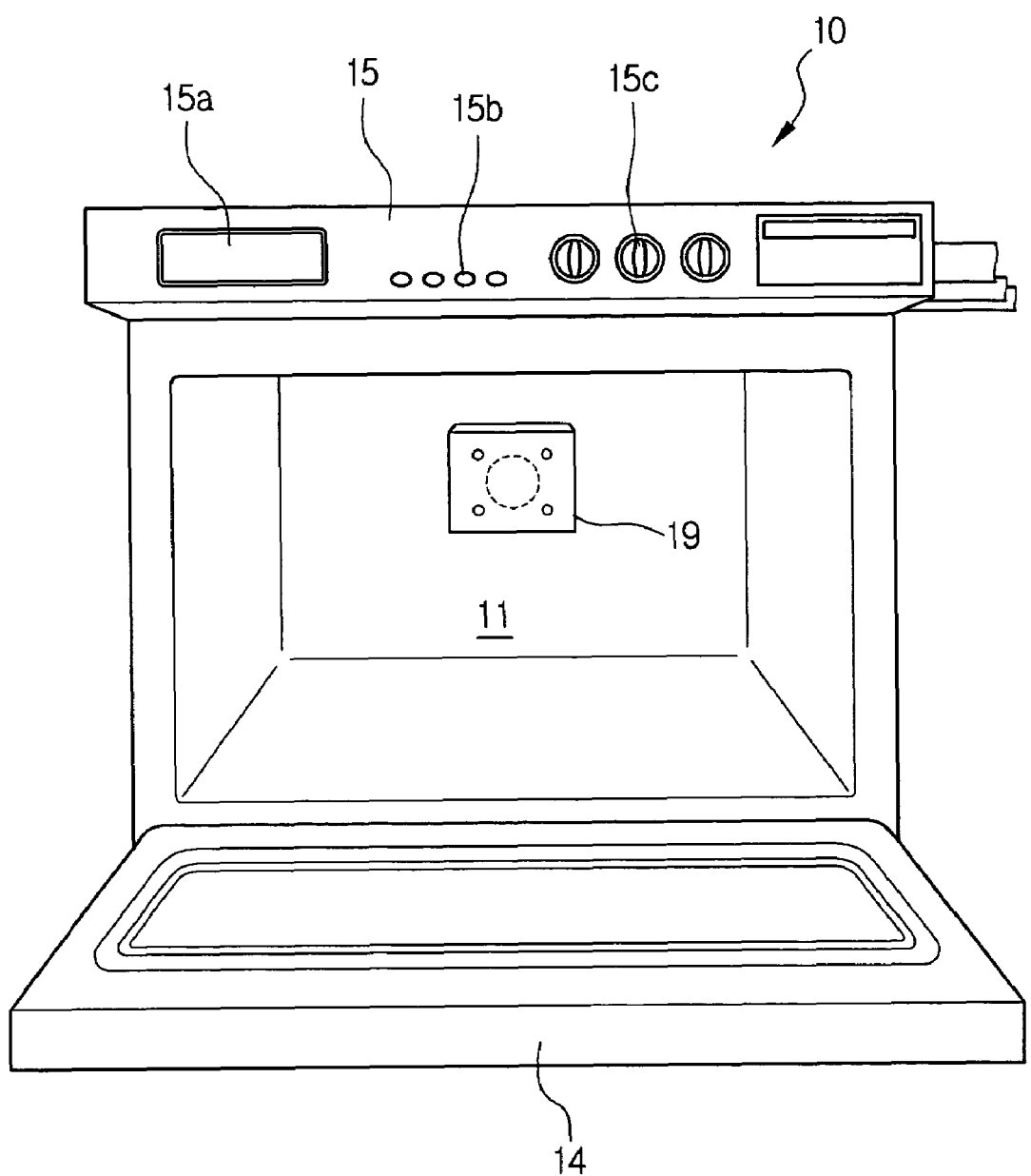
FIG. 1 is a perspective view of an overheated steam oven, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
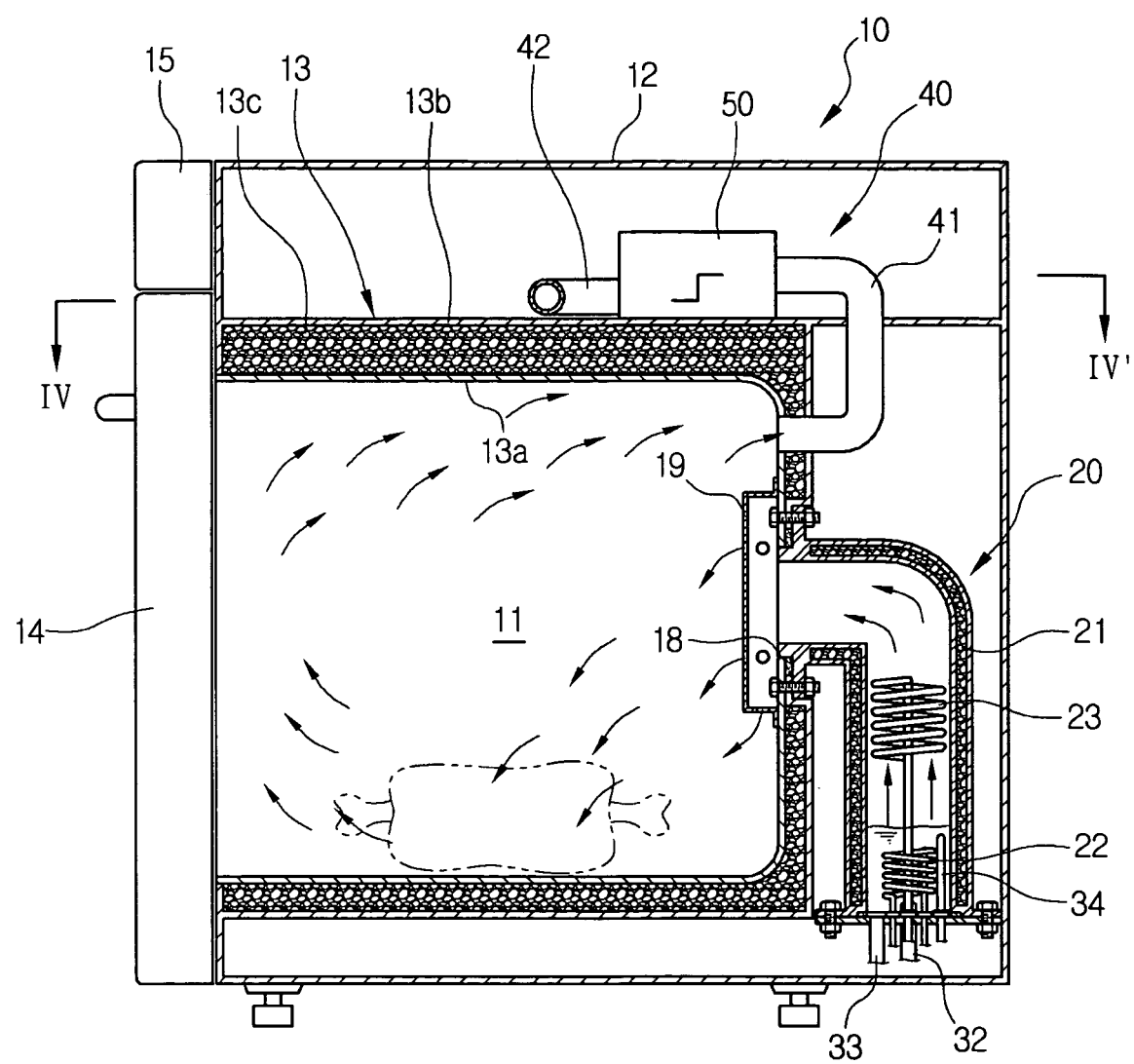
FIG. 2 is a sectional view showing an internal construction of the overheated steam oven of FIG. 1.

As shown in FIGS. 1 and 2, an overheated steam oven according to an embodiment of the present invention includes a cabinet 10 to define a cooking cavity 11 therein, and an overheated steam generator 20, which is mounted to a rear wall in the cabinet 10, so as to supply overheated steam into the cooking cavity 11.

The cabinet 10 includes an outer casing 12, and an inner casing 13, which is installed in the outer casing 12 to be spaced apart from the outer casing 12, to define the cooking cavity 11 therein. The cooking cavity 11 is open at a front thereof so as to allow a user to place and remove foods into and from the cooking cavity 11. The inner casing 13 includes a first casing 13a and a second casing 13b which are spaced apart from each other, and an insulating material 13c which fills a space between the first casing 13a and the second casing 13b, so as to insulate the cooking cavity 11 from an outside of the cooking cavity 11.

A door 14, which is opened downward and closed upward, is attached to the open front of the cabinet 10 so as to allow a user to open and close the cooking cavity 11. A controller 15, which includes a display 15a to display an operational state of the overheated steam oven thereon, various kinds of control buttons 15b, and control switches 15c, are provided at a portion of the cabinet 10 above the door 14.

Figure 3:
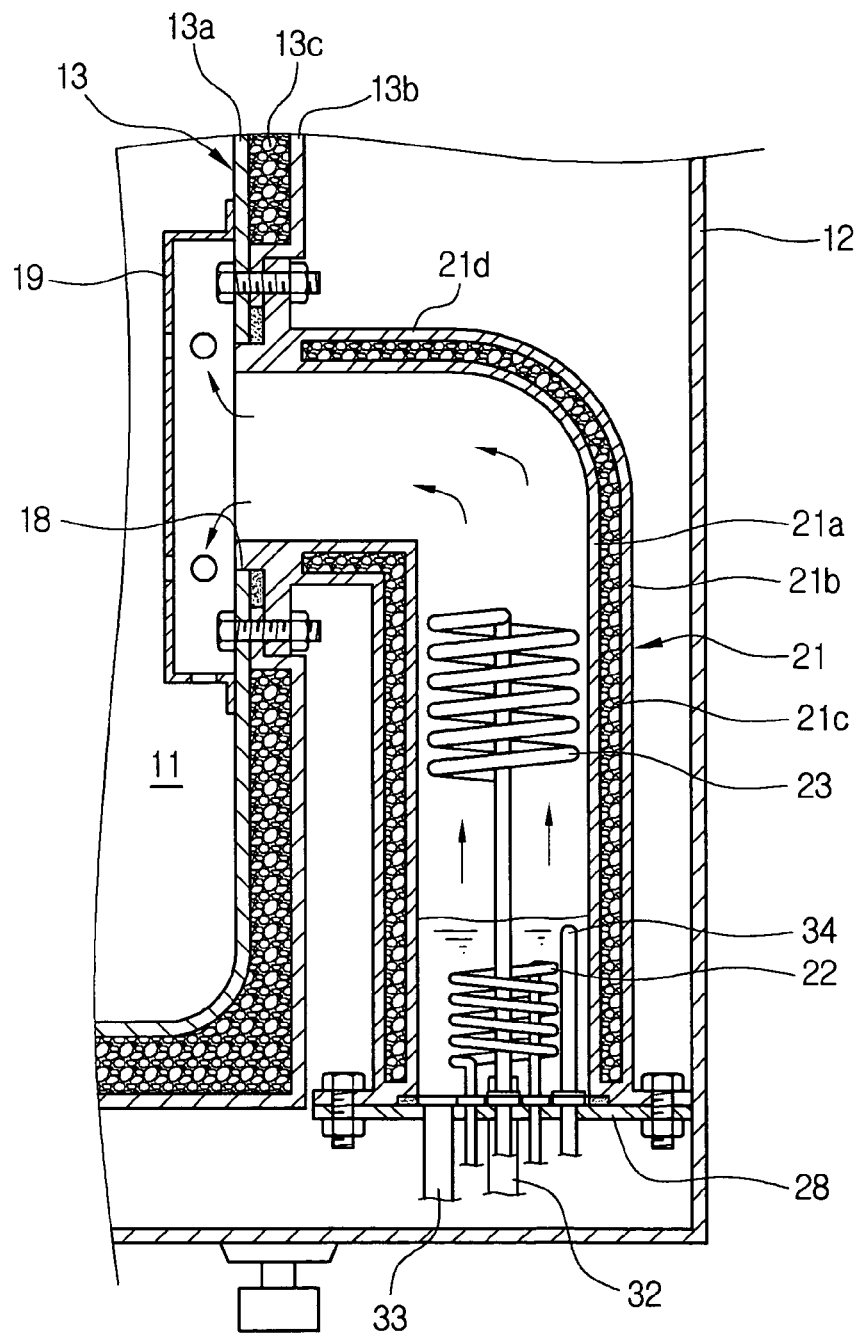
FIG. 3 is an exploded perspective view showing a construction of an overheated steam generator of the overheated steam oven of FIG. 2.

As shown in FIGS. 2 and 3, the overheated steam generator 20, which is provided on the rear wall of the cooking cavity 11, includes a steam generating vessel 21. An outlet of the steam generating vessel 21 is connected to a steam inlet port 18 provided on the rear wall of the cooking cavity 11, with a predetermined amount of water contained in the steam generating vessel 21. The overheated steam generator further includes a first heater 22, which is mounted to a lower portion in the steam generating vessel 21, and a second heater 23, which is mounted to an upper portion in the steam generating vessel 21.

The steam generating vessel 21 is a vacuum insulating vessel so that a space therein is insulated from an outside thereof to minimize heat loss. That is, the steam generating vessel 21 includes an inner vessel part 21a, and an outer vessel part 21b which surrounds an outer surface of the inner vessel part 21a while being spaced apart from the outer surface of the inner vessel part 21a. A shielding material 21c fills a space between the inner vessel part 21a and the outer vessel part 21b to intercept radiant heat. The space between the inner vessel part 21a and the outer vessel part 21b is sealed in a vacuum state, once the vacuum state is induced.

The steam generating vessel 21 further includes a bent part 21d which is formed by bending an upper end of the steam generating vessel 21 toward the rear wall of the cooking cavity 11. A front end of the bent part 21d, which is the outlet of the steam generating vessel 21, is connected to the steam inlet port 18 provided on the rear wall of the cooking cavity 11. A cover 19, on which a plurality of steam discharging holes are formed, is mounted to an inner surface of the rear wall of the cooking cavity 11 to allow the overheated steam generated by the overheated steam generator 20 to be evenly distributed into the cooking cavity 11.

The first heater 22, which is mounted to the lower portion in the steam generating vessel 21, and the second heater 23, which is mounted to the upper portion in the steam generating vessel 21, each have a spiral shape so as to maximize a heat transferring surface area. A feed pipe 32 to feed water into the steam generating vessel 21, a drain pipe 33 to drain the water from the steam generating vessel 21, and a water level sensor 34 to monitor a level of the water contained in the steam generating vessel 21, are respectively mounted to a lower plate 28. The lower plate 28 is mounted to a lower end of the steam generating vessel 21.

When the predetermined amount of water is fed into the steam generating vessel 21, the first heater 22, which is provided at the lower portion of the steam generating vessel 21, is immersed in the water contained in the steam generating vessel 21, and the second heater 23, which is provided at the upper portion of the steam generating vessel 21, is placed above the water which is contained in the steam generating vessel 21 and reaches a maximum water level. Due to the above-mentioned construction, the overheated steam is generated by allowing the second heater 23 to further heat the steam generated by an operation of the first heater 22 while the steam rises toward the outlet of the steam generating vessel 21.

As shown in FIG. 2, the overheated steam oven of the present invention further includes an overheated steam discharger 40 to discharge the overheated steam from the cooking cavity 11 to an outside of the cabinet 10 after condensing the overheated steam to prevent the user from being burnt by the discharged overheated steam. The overheated steam discharger 40 includes a steam discharging path to exchange heat with the overheated steam discharged from the cooking cavity 11. The overheated steam discharger 40 includes first and second steam discharging pipes 41 and 42 extending from the cooking cavity 11 to the outside of the cabinet 10 to define the steam discharging path. The overheated steam discharger 40 further includes a steam condensing vessel 50 which is provided above the cooking cavity 11 between the first and second steam discharging pipes 41 and 42. The steam condensing vessel 50 condenses the overheated steam having a high temperature, which is discharged from the cooking cavity 11, into water.

Figure 4:
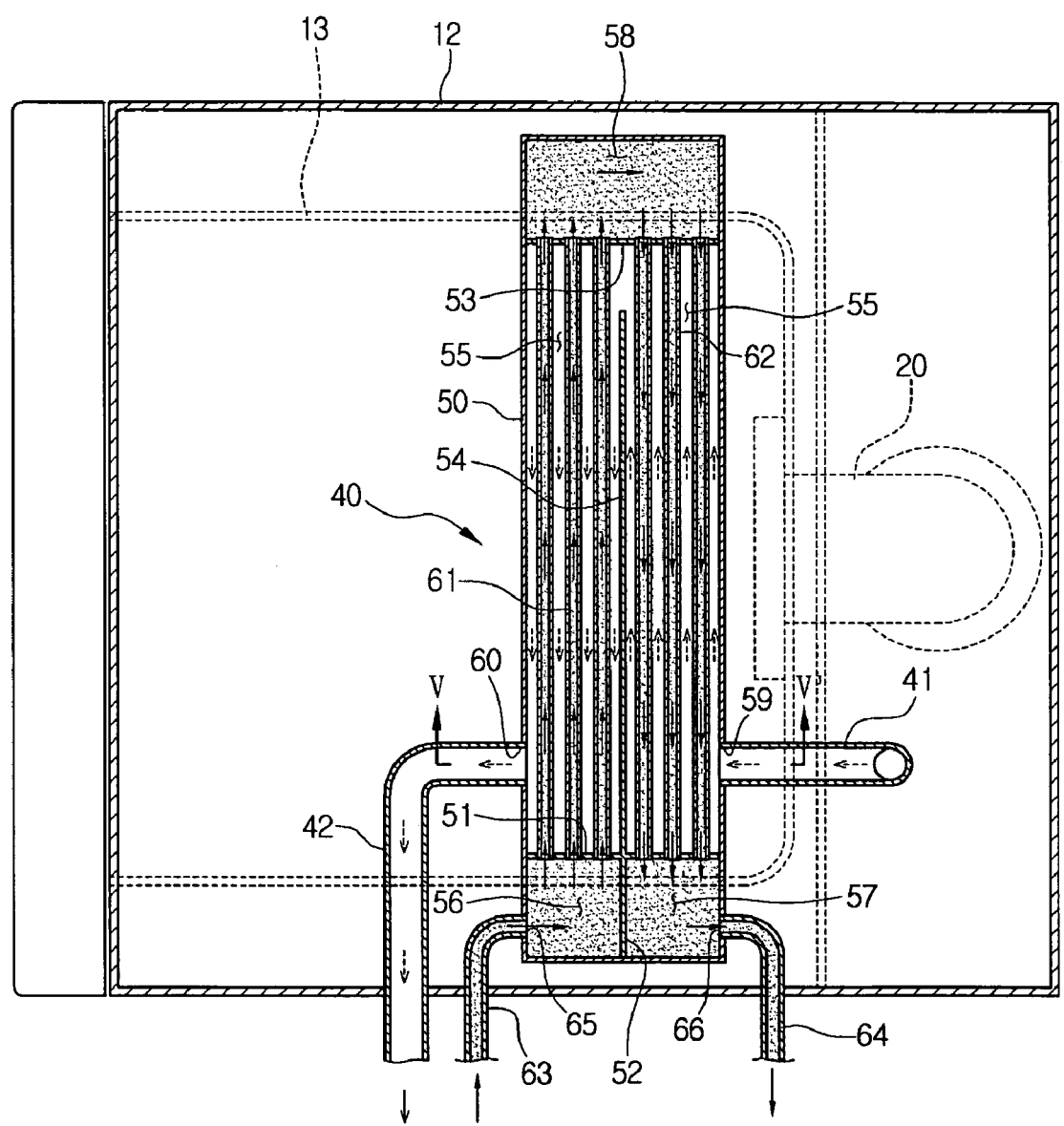
FIG. 4 is a sectional view taken along the line IV-IV' of FIG. 2.
Figure 5:
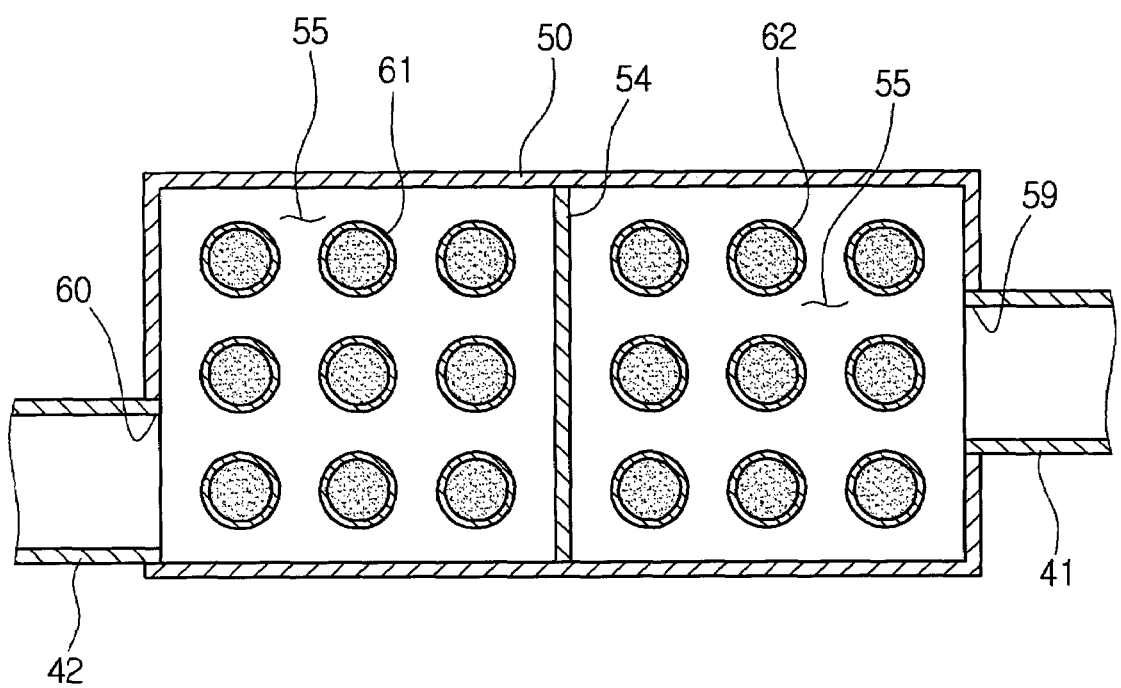
FIG. 5 is a sectional view taken along the line V-V' of FIG. 4.

As shown in FIGS. 4 and 5, the steam condensing vessel 50 has a rectangular box shape. The steam condensing vessel 50 includes a cooling water inlet chamber 56 and a cooling water outlet chamber 57 which are provided at a first end in the steam condensing vessel 50. The cooling water inlet chamber 56 and the cooling water outlet chamber 57 are partitioned, by a first partition 51, from a steam condensing chamber 55, in the steam condensing vessel 50 to pass the overheated steam discharged from the cooking cavity 11. The cooling water inlet chamber 56 and the cooling water outlet chamber 57 are partitioned from each other by a second partition 52. The steam condensing vessel 50 further includes a cooling water passing chamber 58 which is provided in the steam condensing vessel 50 at a second end opposite to both the cooling water inlet chamber 56 and the cooling water outlet chamber 57. The cooling water passing chamber 58 is partitioned from the steam condensing chamber 55 by a third partition 53.

The steam condensing vessel 50 further includes a steam inlet 59 and a steam outlet 60, which are respectively provided on opposite sidewalls of the steam condensing vessel 50, which are close to the cooling water outlet chamber 57 and the cooling water inlet chamber 56. The first steam discharging pipe 41, which extends from the cooking cavity 11, is coupled to the steam inlet 59 of the steam condensing vessel 50 to supply the overheated steam discharged from the cooking cavity 11 into the steam condensing chamber 55. The second steam discharging pipe 42, which extends from the steam condensing vessel 50 to the outside of the cabinet 10, is coupled to the steam outlet 60 of the steam condensing vessel 50 to discharge the overheated steam passing through the steam condensing chamber 55 to the outside of the cabinet 10.

The steam condensing vessel 50 further includes a fourth partition 54 which is longitudinally provided in the steam condensing chamber 55 to partition a space defined in the steam condensing chamber 55 to increase a length of the steam discharging path in the steam condensing chamber 55. The fourth partition 54 is perpendicular to both the steam inlet 59 and the steam outlet 60. The fourth partition 54 is mounted at a first end thereof, which is close to both the steam inlet 59 and the steam outlet 60 on the first partition 51 of the steam condensing vessel 50, and is spaced apart from the third partition 53 of the steam condensing vessel 50 at a second end of the fourth partition 54, thus defining the steam discharging path in the steam discharging chamber 55. Due to the above-mentioned construction of the steam condensing chamber 55, the overheated steam, drawn into the steam condensing chamber 55 through the steam inlet 59, flows toward the cooling water passing chamber 58 in the steam condensing chamber 55 prior to being discharged to the outside of the cabinet 10 through the steam outlet 59. Thus, the arrangement of the first, second, third, and fourth partitions extends the length of the steam discharging path in the steam condensing chamber 55.

The steam condensing vessel 50 further includes a plurality of first cooling water pipes 61, which are coupled at inlets thereof to the cooling water inlet chamber 56 and are coupled at outlets thereof to the cooling water passing chamber 58. The steam condensing vessel 50 further includes a plurality of second cooling water pipes 62, which are coupled at inlets thereof to the cooling water passing chamber 58 and are coupled at outlets thereof to the cooling water outlet chamber 57. The plurality of first and second cooling water pipes 61 and 62 are arranged in the steam condensing chamber 55 to be spaced apart from each other, so as to efficiently exchange heat with the overheated steam passing through the steam condensing chamber 55.

The steam condensing vessel 50 further includes a cooling water inlet 65 which is provided on a predetermined portion of the cooling water inlet chamber 56 and is coupled to a cooling water feed pipe 63 extending from an external water source. The steam condensing vessel 50 further includes a cooling water outlet 66 which is provided on a predetermined portion of the cooling water outlet chamber 57 and is coupled to a cooling water discharging pipe 64 to discharge the cooling water to the outside of the cabinet 10.

Due to the above-mentioned construction of the overheated steam discharger 40, the overheated steam, drawn into the steam condensing chamber 55 through the steam inlet 59 after being discharging from the cooking cavity 11, flows to the steam outlet 60 along the steam discharging path in the steam condensing chamber 55. In the above state, the cooling water, supplied into the cooling water inlet chamber 56, flows to the cooling water outlet chamber 57 along the first and second cooling water pipes 61 and 62 via the cooling water passing chamber 58. Therefore, the overheated steam passing through the steam condensing chamber 55 is discharged to the outside after being condensed into the water by exchanging heat with the cooling water flowing along the first and second cooling water pipes 61 and 62.

As shown in FIG. 5, the steam outlet 60 of the steam condensing vessel 50 is provided on a lower portion of the steam condensing vessel 50. Thus, the water, condensed from the overheated steam passing through the steam condensing chamber 55, is efficiently discharged to the outside of the cabinet 10 through the second steam discharging pipe 42 which is coupled to the steam outlet 60.

The operation and effect of the overheated steam oven of the present invention will be described herein below.

First, foods are placed in the cooking cavity 11. Thereafter, the overheated steam oven is operated and the water contained in the steam generating vessel 21 is heated by both the first heater 22 and the second heater 23 so as to generate the overheated steam. Steam is then is generated by boiling the water contained in the lower portion of the steam generating vessel 21 by using the first heater 22 which is immersed in the water. The steam is overheated by using the second heater 23 while the steam rises in the steam generating vessel 21. The overheated steam is supplied into the cooking cavity 11 through the outlet of the steam generating vessel 21, so that the foods in the cooking cavity 11 are cooked by the heat of the overheated steam.

After cooking is finished, the overheated steam is discharged to the outside of the cabinet 10 through the overheated steam discharger 40 which is provided above the cooking cavity 11. The overheated steam discharged from the cooking cavity 11 is drawn into the steam condensing vessel 50 through the first steam discharging pipe 41 and the steam inlet 59, as shown in FIG. 4. Thereafter, the overheated steam, having been drawn into the steam condensing vessel 50, is discharged to the outside of the cabinet 10 through the steam outlet 60 of the steam condensing vessel 50 and the second steam discharging pipe 42 after passing through the steam discharging path in the steam condensing chamber 55. While the overheated steam passes through the steam condensing chamber 55, the cooling water is supplied into the cooling water inlet chamber 56 of the steam condensing vessel 50 through the cooling water feed pipe 63. The cooling water continues to flow into the cooling water passing chamber 58, placed at the second end of the steam condensing vessel 50 opposite to the cooling water inlet chamber 56, through the plurality of first cooling water pipes 61. Sequentially, the cooling water, having been supplied into the cooling water passing chamber 58, flows into the cooling water outlet chamber 57 through the plurality of second cooling water pipes 62. The cooling water of the cooling water outlet chamber 57 is then discharged through the cooling water discharging pipe 64 to the outside of the cabinet 10.

Therefore, most of the overheated steam, drawn into the steam condensing chamber 55 after being discharged from the cooking cavity 11, is condensed into water in the steam condensing chamber 55 by exchanging heat with the plurality of first and second cooling water pipes 61 and 62 while the overheated steam flows from the steam inlet 59 to the steam outlet 60. Even though some of the overheated steam, passing through the steam condensing chamber 55, has not yet condensed in the steam condensing chamber 55, the overheated steam is discharged through the steam outlet 60 to the outside of the cabinet 10 after being cooled to a low temperature. At this time, the water, condensed from the overheated steam and collected in the steam condensing chamber 55, is discharged to the outside of the cabinet 10 through the second steam discharging pipe 42 which is coupled to the steam outlet 60 of the steam condensing vessel 50. That is, the steam outlet 60 is provided at a position lower than the steam inlet 59 of the steam condensing vessel 50 as shown in FIG. 5, so that the water in the steam condensing chamber 55 is easily discharged through the steam outlet 60 to the outside of the cabinet 10.

As is apparent from the above description, an overheated steam oven of the present invention discharges overheated steam from a cooking cavity to an outside of the overheated steam oven after condensing or cooling the overheated steam into water or a state of a low temperature by allowing the overheated steam to exchange heat with a plurality of cooling water pipes of an overheated steam discharger while the overheated steam passes through the overheated steam discharger, thus preventing a user from being burnt by the discharged overheated steam.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. An overheated steam oven, comprising:
   a cabinet to define a cooking cavity therein;
   an overheated steam generator to supply overheated steam into the cooking cavity;
   an overheated steam discharger, including a steam discharging path, and a cooling water path, which is provided on the steam discharging path, to exchange heat with the overheated steam discharged from the cooking cavity to the outside, and to discharge the overheated steam from the cooking cavity to an outside after condensing the overheated steam, wherein the overheated steam discharger comprises:
      first and second steam discharging pipes extending from the cooking cavity to the outside of the cooking cavity to define the steam discharging path, and
      a steam condensing vessel between the first and second steam discharging pipes, to define the cooling water path therein, the steam condensing vessel comprising:
         a steam condensing chamber in the steam condensing vessel, to pass the overheated steam discharged from the cooking cavity,
         a steam inlet and a steam outlet on opposite sidewalls of the steam condensing vessel, to be coupled to the first and second steam discharging pipes, respectively,
         a cooling water inlet chamber in the steam condensing vessel and partitioned from the steam condensing chamber, with a cooling water inlet provided on a predetermined portion of the cooling water inlet chamber,
         a cooling water outlet chamber in the condensing vessel and partitioned from both the steam condensing chamber and the cooling water inlet chamber, with a cooling water outlet provided on a predetermined portion of the cooling water outlet chamber, and
         a cooling water pipe in the steam condensing chamber to define the cooling water path along which cool water flows from the cooling water inlet chamber to the cooling water outlet chamber via the steam condensing chamber; and
      a partition provided in the steam condensing chamber to partition a space defined in the steam condensing chamber, to increase a length of the steam discharging path in the steam condensing chamber.
2. The overheated steam oven according to claim 1, wherein the cooling water pipe comprises a plurality of cooling water pipes which are spaced apart from each other in the steam condensing chamber.
3. The overheated steam oven according to claim 1, wherein the steam condensing vessel has a rectangular box shape, and both the cooling water inlet chamber and the cooling water outlet chamber are provided at a first end in the steam condensing vessel to be close to each other, and the steam condensing vessel further comprises a cooling water passing chamber which is provided at a second end in the steam condensing vessel, and
   the cooling water pipe comprises:
      a first cooling water pipe coupled at an inlet thereof to the cooling water inlet chamber and coupled at an outlet thereof to the cooling water passing chamber; and
      a second cooling water pipe coupled at an inlet thereof to the cooling water passing chamber and coupled at an outlet thereof to the cooling water outlet chamber.

4. The overheated steam oven according to claim 3, wherein the first cooling water pipe comprises a plurality of cooling water pipes which are spaced apart from each other in the steam condensing chamber, and the second cooling water pipe comprises a plurality of cooling water pipes which are spaced apart from each other in the steam condensing chamber.

5. The overheated steam oven according to claim 3, further comprising:
 a partition longitudinally provided along the cooling water pipe in the steam condensing chamber, to partition a space defined in the steam condensing chamber, and to increase a length of the steam discharging path in the steam condensing chamber.

6. The overheated steam oven according to claim 5, wherein the steam inlet and the steam outlet of the steam condensing chamber are respectively provided on the opposite sidewalls of the steam condensing vessel which are close to the cooling water outlet chamber and the cooling water inlet chamber, and
 the partition extends into the space defined in the steam condensing chamber to be perpendicular to both the steam inlet and the steam outlet, and is mounted at a first end thereof, which is close to the steam inlet and the steam outlet, onto an inner surface of the steam condensing chamber, and is spaced apart from the inner surface of the steam condensing chamber at a second end of the partition, so that the partition closes the steam discharging path at the first end thereof and opens the steam discharging path at the second end thereof, to define the steam discharging path in the steam discharging chamber.

7. The overheated steam oven according to claim 1, further comprising:
 a cooling water feed pipe coupled to the cooling water inlet; and
 a cooling water discharging pipe coupled to the cooling water outlet.

8. The overheated steam oven according to claim 1, wherein the steam outlet is provided on a lower portion of the steam condensing vessel so that the water, condensed from the overheated steam passing through the steam condensing chamber, is discharged to the outside.

9. An overheated steam oven, comprising:
 a cabinet to define a cooking cavity therein;
 an overheated steam generator to supply overheated steam into the cooking cavity;
 an overheated steam discharger, including a steam discharging path, and a cooling water path, which is provided on the steam discharging path, to exchange heat with the overheated steam discharged from the cooking cavity to the outside, and to condense the overheated steam to water and discharge substantially all of the condensed steam from the cooking cavity to an outside,
 wherein the overheated steam discharger comprises:
  first and second steam discharging pipes extending from the cooking cavity to the outside of the cooking cavity to define the steam discharging path, and
  a steam condensing vessel between the first and second steam discharging pipes, to define the cooling water path therein, the steam condensing vessel comprising:
   a steam condensing chamber in the steam condensing vessel, to pass the overheated steam discharged from the cooking cavity, and
   a steam inlet and a steam outlet on opposite sidewalls of the steam condensing vessel, to be coupled to the first and second steam discharging pipes, respectively,
   the second steam discharging pipe being angled downward relative to a point where the water collects in the steam condensing chamber; and
  a partition provided in the steam condensing chamber to partition a space defined in the steam condensing chamber, to increase a length of the steam discharging path in the steam condensing chamber.

10. The overheated steam oven according to claim 9, wherein the second steam discharging pipe discharges substantially all of the condensed steam from the cooking cavity to an outside.

* * * * *